United States Patent [19]

Neumayer et al.

[11] 4,145,236

[45] Mar. 20, 1979

[54] CARTON SEALING METHOD AND APPARATUS

[75] Inventors: Jack M. Neumayer, Wixom; Ivan L. Kauffman, Union Lake, both of Mich.

[73] Assignee: Ex-Cell-O Corporation, Troy, Mich.

[21] Appl. No.: 846,481

[22] Filed: Oct. 28, 1977

Related U.S. Application Data

[63] Continuation of Ser. No. 730,765, Oct. 8, 1976, abandoned.

[51] Int. Cl.² .............................................. B30B 15/34
[52] U.S. Cl. ..................................... 156/73.1; 53/379; 93/44.1 R; 156/583
[58] Field of Search ............ 53/76, 373, 379, DIG. 2, 53/388; 93/44.1 R, 44.1 GT; 156/73.1, 73.4, 73.6, 282, 306, 311, 580, 581, 583

[56] References Cited

U.S. PATENT DOCUMENTS

| 3,166,462 | 1/1965 | Schoder ............................... 156/311 |
| 3,535,848 | 10/1970 | Gellatly et al. ......................... 53/373 |
| 3,905,280 | 9/1975 | Egleston et al. .................... 93/44.1 R |
| 3,910,014 | 10/1975 | Braun ..................................... 53/373 |
| 3,956,046 | 5/1976 | Tsuchiya et al. .................... 156/73.4 |
| 3,996,724 | 12/1976 | Smith ..................................... 53/76 |
| 4,072,089 | 2/1978 | Bosche ........................... 93/44.1 GT |

*Primary Examiner*—John E. Kittle
*Attorney, Agent, or Firm*—Reising, Ethington, Barnard, Perry & Brooks

[57] ABSTRACT

Apparatus for forming a seal between layers of a carton of thermoplastic coated paperboard material and the like wherein the thermoplastic material in the area to be sealed serves as the sealant and is activated to flow by frictional heat generated by a vibration welding horn and is then allowed to cool and set under pressure to form the seal between the layers. The carton first moves to an activating station wherein the layers to be sealed are engaged on opposite surfaces by a vibrating horn and a back-up member (in the form of an anvil or a mandrel) for a time sufficient to activate the thermoplastic material to flow. The carton is then carried to a clamping and sealing station at a different location from the activating station with the thermoplastic material in the activated state. The layers to be sealed with the activated thermoplastic is then engaged on opposite surfaces by a pressure pad and the back-up member for a predetermined period of time to permit the activated thermoplastic to cool and set and form a seal. A holding member extends between the activating and clamping and sealing stations. The holding member overlies the back-up member for engaging the outer surface of the layers to hold the layers together in cooperation with the back-up member when the carton is located at either of the stations or between the stations. The holding member is slotted to permit the horn and pressure pad to engage the outer surface of the layers while the layers are held in the closed position between the holding member and back-up member.

40 Claims, 12 Drawing Figures

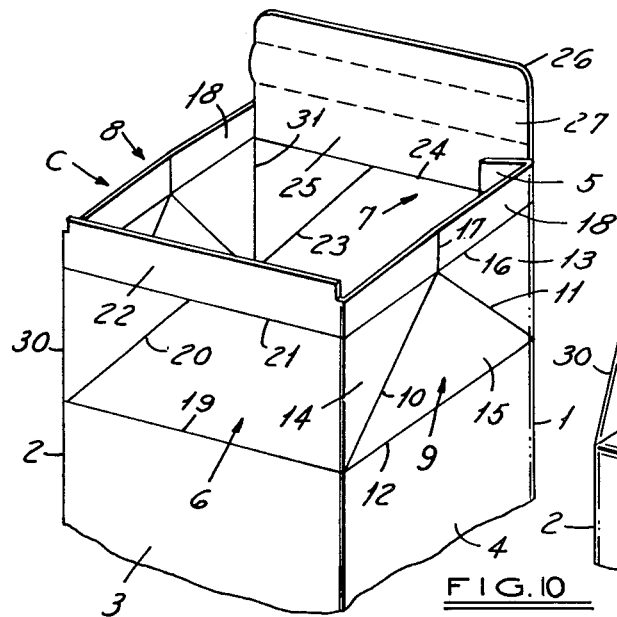
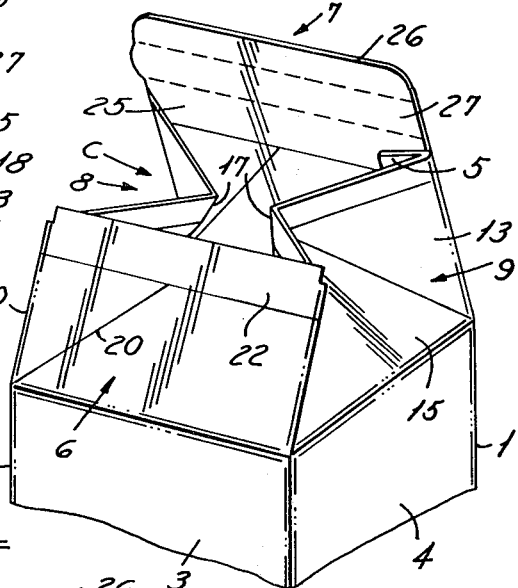
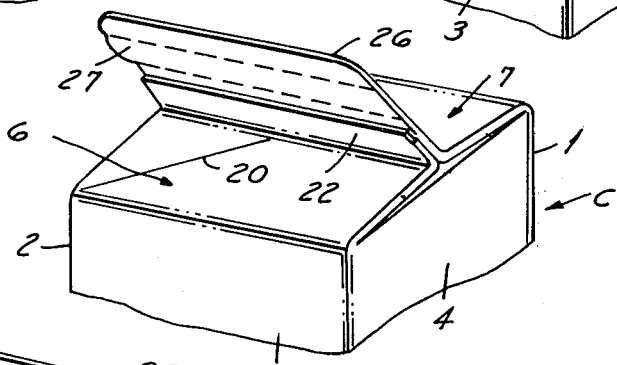
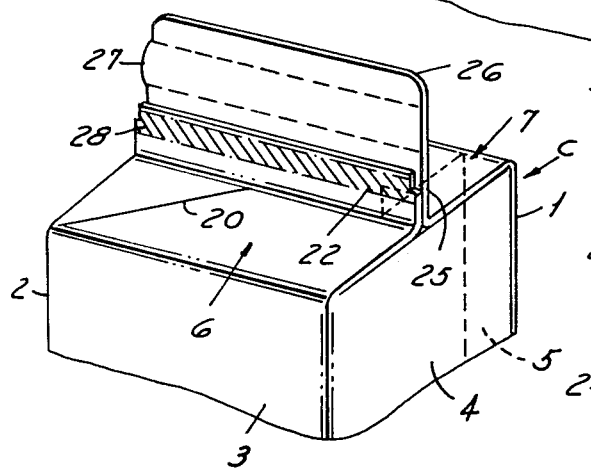
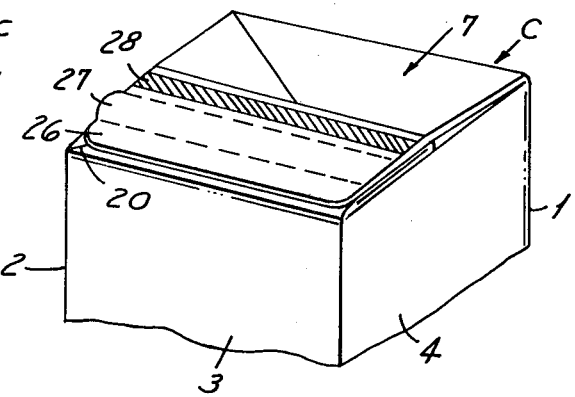

CARTON SEALING METHOD AND APPARATUS

This is a continuation, of application Ser. No. 730,765 filed Oct. 8, 1976, now abandoned.

BACKGROUND OF THE INVENTION

1. Field of the Invention

This invention relates generally to packaging methods and apparatus, and is particularly concerned with a method and apparatus for forming a seal between layers of a carton of thermoplastic coated paperbo When the horn is used exclusively for both stages, a complete cycle of forming a seal between the layers of the carton involves (1) bringing the working surfaces of the anvil (or other back-up means) and horn into opposed relationship on opposite sides of the layers to be joined and sealed, (2) activating the thermoplastic coating of the layers between the work surface by the frictional heat of the energized horn to cause the coating of the layers to flow together, (3) permitting the previously activated thermoplastic material to cool and set while still held between the working surfaces of the anvil and deenergized horn, and (4) separating the working surfaces of the anvil and horn to remove the carton layers after the seal has been formed. The time involved per cycle to date has been in the range of approximately one-half to two seconds, or more, depending upon the thickness of the paperboard, the thickness of the thermoplastic coating, the number of layers, and the surface area to be sealed.

It has been conventional in vibration welding operations of this type to pressure actuate the horn to start the horn vibrating. As the working surface of the horn moves into contact with the layers of the carton to be joined together, the horn starts vibrating when a predetermined pressure on the working surface of the horn is sensed by the horn actuating controls. In a high production packaging system, the available time for the sealing operation is determined primarily by the speed at which the cartons must pass through the welding cycle as determined by the speed of other machines in the total system. For example, the welding apparatus must be incorporated into a system including machines for feeding and erecting cartons from flat blank form, such as machines of the type disclosed in Allen U.s. Pat. No. 3,599,541 of Aug. 17, 1971 and in Kellogg U.S. Pat. No. 3,937,131 of Feb. 10, 1976, and filling and closing apparatus such as disclosed in Braun U.S. Pat. No. 3,910,014.

U.S. application Ser. No. 652,916 of Eugene R. Bosche and Earle W. Walke, Jr., filed Jan. 28, 1976, and assigned to the assignee of this application, discloses an apparatus and method for vibration welding thermoplastic coated paperboard containers wherein the vibration welding horn is "pre-triggered" to start it into vibration prior to the time it engages the layers of the container to be sealed. U.S. application Ser. No. 690,221 of Eugene R. Bosche, filed May 26, 1976, and assigned to the assignee of this application, discloses a method and apparatus for forming a seal between the layers of thermoplastic coated paperboard cartons by vibration or sonic welding in which the vibration welding horn is utilized to activate the thermoplastic material of the carton. The carton is then moved to a clamping and cooling station with the thermoplastic material still activated, where the activated layers are then clamped and cooled to form a seal. The entire disclosures of U.S. application Ser. Nos. 652,916 and 690,221 are incorporated herein by reference.

In further development of the concept of activating the thermoplastic coating at one station and cooling and clamping the layers at another station (i.e., two-station sonic sealing), it has been found desirable, at least in some circumstances, to permit partial setting of the activated thermoplastic at the activation station. The horn is pre-triggered to cause it to start vibrating before it comes into clamping engagement with the paperboard layers. After the activation time has been completed, the horn stops vibrating but remains in clamping engagement with the layers to permit partial setting of the activated thermoplastic to begin formation of the seal. The horn is then withdrawn, and the container moves to a clamping and cooling station to complete the formation of the seal by clamping and cooling the layers for the time necessary to complete the setting of the activated thermoplastic.

SUMMARY OF THE INVENTION

An object of this invention is to provide an improved method and apparatus for forming a seal between layers of thermoplastic coated paperboard material and the like by vibration welding wherein the thermoplastic coating is activated at one station, and is cooled and completely set at another station to form a seal.

A further object is to provide a method and apparatus for closing and sealing the end closures of cartons of thermoplastic coated paperborad material or the like wherein the thermoplastic coating is activated at an activating station by vibration welding at one location and then allowed to partially set at the activating station, and wherein the layers with the partially activated thermoplastic are then moved to a clamping and sealing station to another location where the layers are clamped together until the activated thermoplastic cools and completely sets to form a seal.

A method in accordance with the present invention includes the steps of moving an end closure of a container into an activating station with the layers of the end closure closed together between a holding member and the working surface of a back-up member, pre-triggering a vibrating welding horn to energize the horn to vibrate at a predetermined frequency, moving the energized welding horn into engagement with the outer surface of the layers to be sealed to clamp the layers between the working surface of the welding horn and the working surface of the back-up member with the welding horn being out of engagement with the holding member, holding the energized welding horn in engagement with the outer surface of the layers to be sealed for a predetermined period of time at a predetermined pressure, deenergizing the horn while leaving it in clamping engagement with the paperboard layers for a predetermined period of time to permit the activated thermoplastic to partially set, retracting the deenergized horn out of engagement with the layers, moving the carton to a clamping and cooling station with the thermoplastic coating still partially set with the holding member preventing the layers from separating, engaging the outer surface of the layers with a pressure pad, and holding the pressure pad in engagement with the layers to cooperate with the back-up member to apply a predetermined clamping pressure on the layers until the thermoplastic material completely sets, and removing the layers from the clamping and cooling station.

Apparatus in accordance with the present invention includes an anvil or other back-up member extending between a sealant activating station and a clamping and sealing station. A vibration welding horn is located at the activating station, and a pressure pad is located at the clamping and sealing station. The back-up member has a working surface which cooperates with both the working surface of the horn and the working surface of the pressure pad to apply clamping pressure to layers of thermoplastic material disposed therebetween. A holding member extends between the station and overlies the working surface of the anvil. When the layers of the end closure of a carton are fed into the activating station, the layers are held in a closed position between the anvil working surface and holding member. In the illustrated embodiment, the holding member is slotted, and the welding horn and pressure pad engage the surface of the layers that are exposed in the slot of the holding member.

When a thermoplastic coated paperboard container is fed into the activating station, the end closure is held in a closed position between the holding member and anvil. The horn is then energized and brought into engagement with the outer surface of the end closure in the area to be sealed to activate the thermoplastic coating of the layers. The horn is then deenergized, and held in clamping relationship to permit partial setting of the activated thermoplastic. The horn is then retracted, and the carton is moved to the clamping and sealing station while the layers are still held in their closed position between the holding member and working surface of the anvil. At the clamping and sealing station, the pressure pad is actuated to come into engagement with the outer surface of the end closure layers in the area to be sealed. The pressure pad holds the layers in clamped relationship between the working surfaces of the pressure pad and anvil until the thermoplastic material sets to complete the seal.

Other objects, advantages and features of the invention will become apparent from the following description taken in connection with the accompanying drawings.

DESCRIPTION OF THE DRAWINGS

FIG. 8 is a perspective view of a portion of a container of thermoplastic coated paperboard material with the top end closure portion of the container in a fully opened position;

FIG. 9 is a perspective view of the container of FIG. 1 after prebreaking operation in which the panels of the end closure portion have been slightly bent inwardly toward the closed portion.

FIG. 10 is a perspective view of the container of FIGS. 8 and 9 with the end closure portion in the closed condition with a closure flap and sealing strips projecting generally axially from the closed end prior to the sealing operation;

FIG. 11 is a perspective view of the container after the sealing strips have been sealed together; and FIG. 12 is a view of the container with the closure flap folded flat and adhered to the top of the container.

DESCRIPTION OF THE PREFERRED EMBODIMENT

Figure 1:
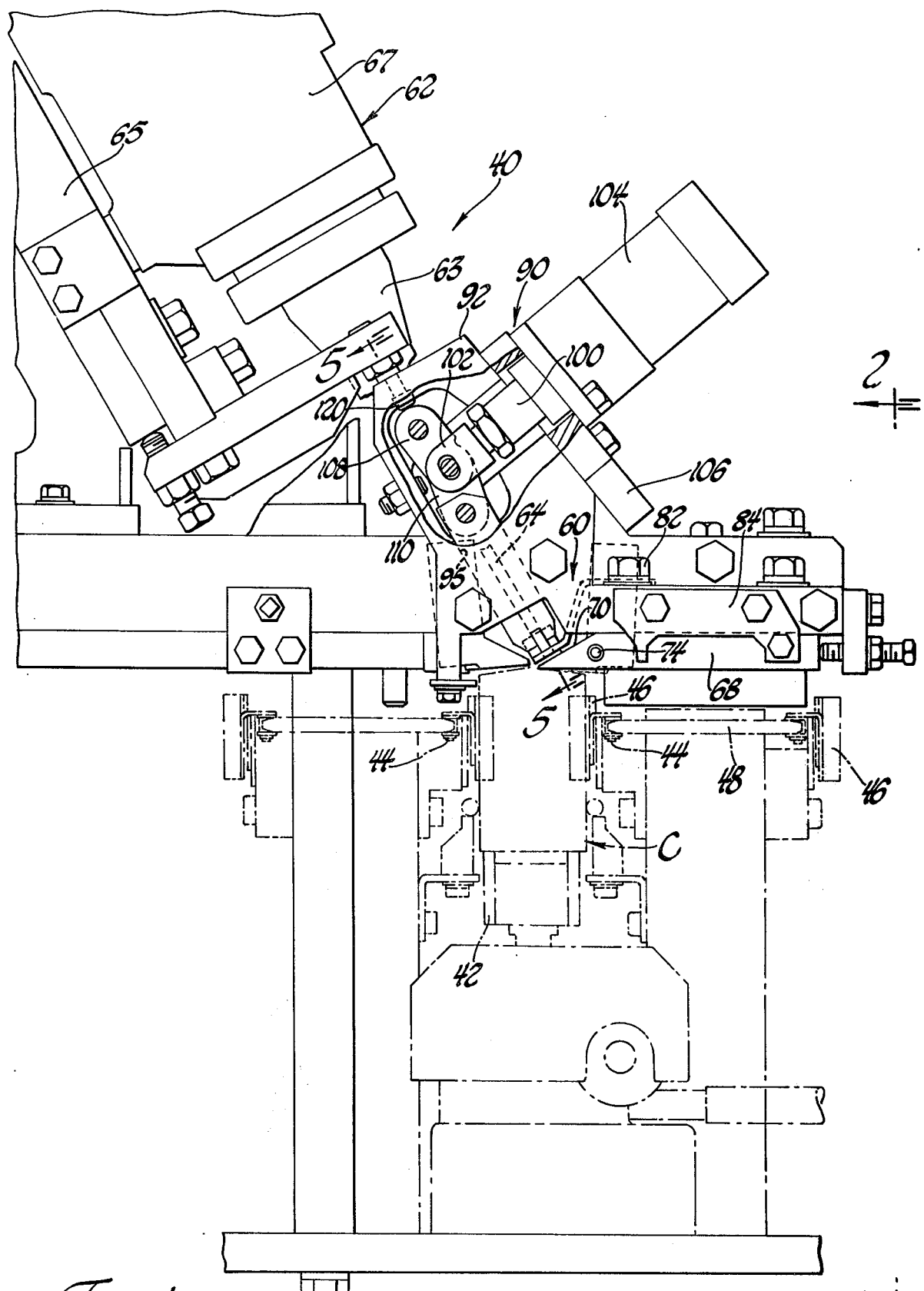
FIG. 1 is an end elevational view of apparatus embodying the invention.

The present invention is primarily concerned with closing and sealing the end closures of thermoplastic coated paperboard cartons of the general type illustrated in FIGS. 8 through 12. However, it should be understood that the invention is not limited to use with any particular form of carton. The invention has use also with cartons of the type shown, for example, in Egleston et al U.S. Pat. Nos. 3,120,335 and 3,905,280. The carton shown in FIGS. 8 through 12 is shown by way of example only, and is of the type illustrated in Braun U.S. Pat. No. 3,910,014.

With reference to FIGS. 8 through 12, a container is designated collectively by reference character C. The container C is provided with a thermoplastic coating, and may be made of paperboard, or the like, coated with thermoplastic material such as polyethylene. The container C is made from a blank of the thermoplastic coated paperboard and may be erected from the blank into the form shown in FIG. 8 by prior art machinery of the type disclosed in the patents referred to above. The body of the container C is of tubular configuration having a rectangular cross-section with four body side panels indicated by reference numerals 1, 2, 3 and 4 with a side sealing flap or panel indicated by reference numeral 5. The flap 5 is bent inwardly from the side panel 4 and sealed to the inner surface of the side panel 1.

The top end closure portion of the container C is shown in its fully open position in FIG. 8 and includes front, rear and side end closure panels 6, 7, 8 and 9, respectively. In the fully open position of FIG. 8, and enc closure panels 6, 7, 8 and 9 project axially from the tubular body of the container. The side panels 8 and 9 are formed into three triangular segments 13, 14 and 15 by scored lines 10, 11 and 12. The triangular segment 15 constitutes a central segment with one side extending along the scored line 12 at the upper end of the respective side panel of the body of the container. A sealing strip or rib 18 is provided at the upper end of the side panel 9 and is separated from the triangular segments by a scored line 16. The center of the sealing strip 18 is provided with a scored line 17 to define an inwardly projecting corner for overlapping engagement with the corresponding corner 17 of the side panel 8 when the top closure portion is folded and sealed to its closed position as is described in greater detail below.

The front panel 6 has a scored line 20 defining a triangular segment adjacent to the side panel 8 which cooperates therewith to define a pouring spout when the container is opened after being filled.

The lower edge of the front end closure panel 6 is connected with the body panel 3 by a scored line 19, and the upper edge of the front panel has projecting therefrom a sealing strip 22, the lower edge of which is defined by a scored line 21.

The rear end closure panel 7 has a scored line 23 corresponding to the scored line 20 of the front panel 6 to define a triangular segment adjacent to the side closure panel 8. The rear closure panel 7 also has a sealing strip 25 projecting from a scored line 24 at the upper edge of the rear closure panel 7. Projecting upwardly from the sealing strip 25 is a closure flap 26 formed intermediate its ends with a tear strip 27. The tear strip 27 is defined between two lines of a series of perforations.

When the container C has been erected from the blank with the end closure portion in the fully open position illustrated in FIG. 8, in which it extends axially from the tubular body of the container, the closure portion can be closed, sealed and folded to the position shown in FIG. 12 in which the end of the container is flat with the front and rear closure panels 6 and 7, respectively, lying flat across the end of the container with the closure flap 26 adhered to and overlying the front panel 6. When the tear strip 27 is removed, the edges 30 and 31 of the closure portion can be pushed upwardly to break the seal 28, and the triangular segments 13, 14 and 15 of the side panel 8, in cooperation with the triangular segments defined by the scored lines 20 and 23 on the front and rear panels 6 and 7, respectively, will define a pouring spout.

The method by which the top, closure portion of the container C is closed from the open position of FIG. 8 to the closed position of FIG. 12 comprises first a "prebreaking" step, by which is meant that the side panels 7 and 8 are bent slightly inwardly to intially bend the triangular segments along the scored lines 10, 11, 12 and 17 to that the side panels will collapse inwardly as the front and rear panels are moved toward each other. The prebreaking operation is described in greater detail in Braun U.S. Pat. No. 3,910,014 and may take place either prior to or subsequent to filling the container with milk or other contents. After the prebreaking step, the front and rear closure panels 6 and 7 are bent toward each other as shown in FIG. 9 to cause the side panels 8 and 9 to collapse inwardly beneath the front and rear panels 6 and 7. The closing operation continues until the lower edges of the sealing strips 18, 22 and 25 along the scored lines 16, 21 and 24 are brought together such that the front and rear panels 6 and 7 lie substantially flat across the end of the container as shown in FIG. 10. With the panels in the position shown in FIG. 10, the sealing strips are sonically welded together along the band indicated by the shaded area 28 in FIGS. 11 and 12. Following the sonic welding step, the closure flap 26 is heated on its outer end of the surface adjacent to the front panel 6, after which the closure flap, together with the sealing strips 18, 22 and 25, are folded downwardly until the closure flap 26 assumes the position shown in FIG. 12. The closure flap 26 is heated on its outer end, as described in U.S. Pat. No. 3,910,014, in such a manner that the tear strip 27 preferably is not adhered to the front panel 6.

Apparatus according to the present invention may be used to close and seal containers such as illustrated in FIGS. 8 through 12 following prebreaking and filling of the container. In FIGS. 1 through 4, reference numeral 40 collectively designates an activating and sealing assembly for closing and sealing the end closure of containers C. The container bottoms are supported on a support bar 42, and are advanced along the support bar 42 by conveyor chains 44 having fingers 46 for engaging the containers. The construction of the conveyor chains and fingers 60 may be of the same construction as that disclosed in U.S. Pat. No. 3,910,014. The conveyor chains 44 are mounted on sprockets 48. The conveyor chains advance the cartons C toward the left, or in the direction of arrows 50 in FIGS. 2 and 3.

Figure 2:
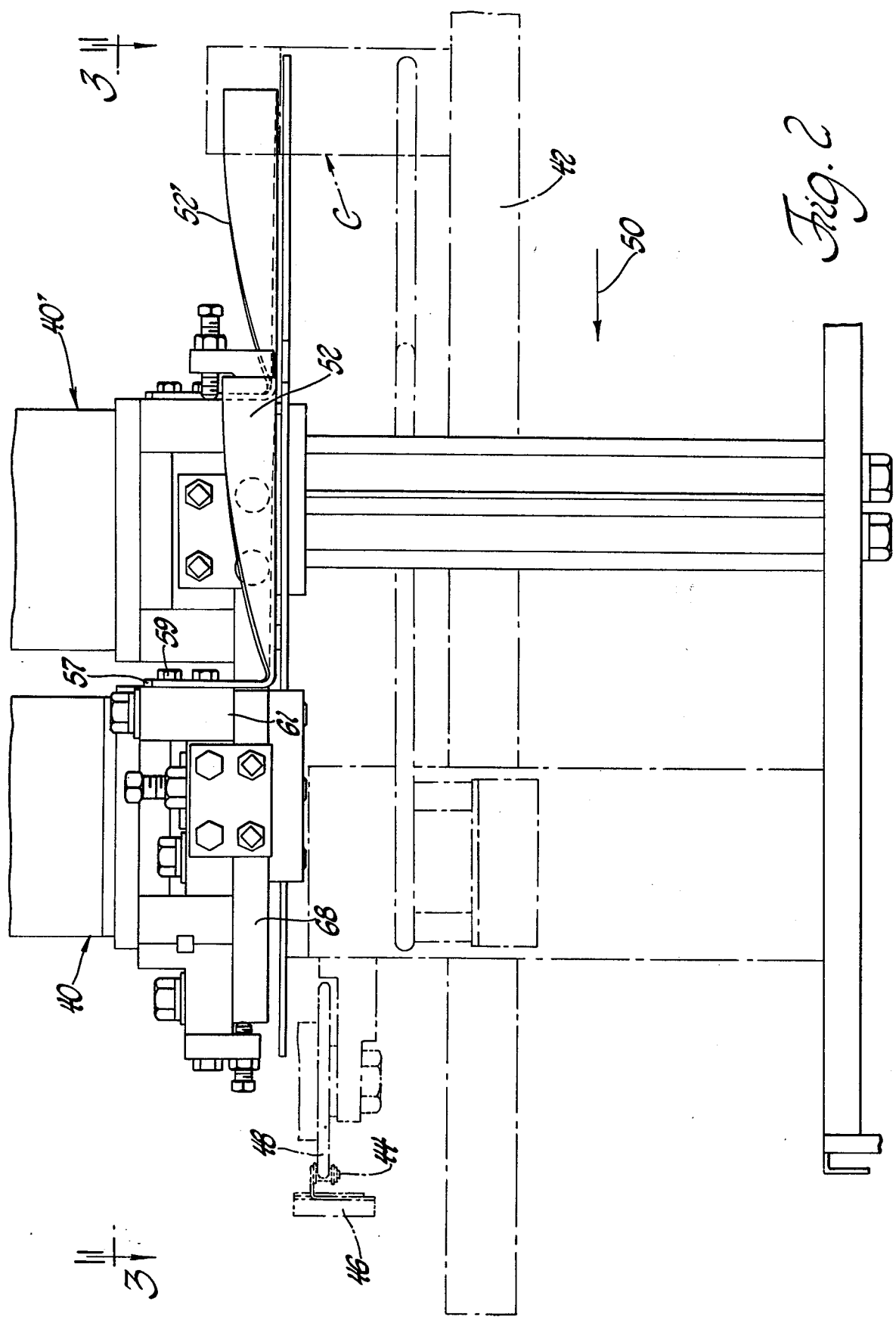
FIG. 2 is a front elevation of the apparatus of FIG. 1 as viewed along lines 2—2 of FIG. 1.
Figure 3:
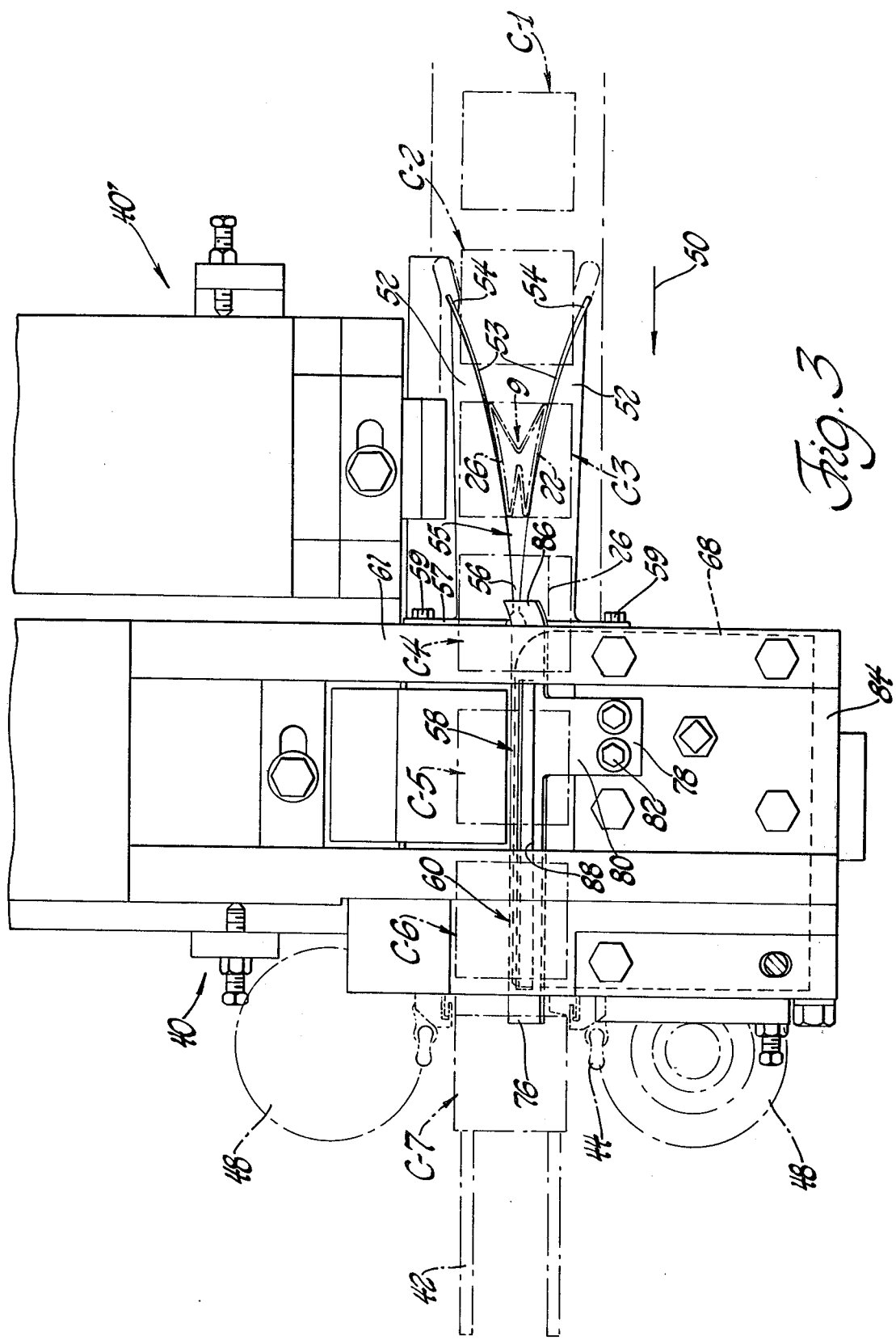
FIG. 3 is a top plan view of the apparatus as viewed along lines 3—3 of FIG. 2.

Seven different positions of the containers are illustrated in FIG. 3 by reference characters C-1, C-2, C-3, C-4, C-5, C-6 and C-7. In the position indicated at C-1, the top end closure of the container is approximately in the condition illustrated in FIG. 9, that is the top end closure has been through a "prebreaking" operation. As the container moves to position C-2, the front and rear closure panels 6 and 7 are engaged by opposed edges 53 of closing plates 52. The edges 53 cooperate to define a closing slot 55 which flares inwardly and downwardly from the inlet ends 54 of edges 53 to the outlet ends 56 of edges 53. Mounting flanges 57 are formed at the inlet ends of each of the closing members 52. Fasteners 50 (FIG. 2) secure the mounting flanges 59 to a support member 61.

As the containers move from the wide end of the closing slot 55 to the narrow end at the support member 61, the front and rear panels 6 and 7 of the end closure of the container are closed together by the edges 53 of the slot. This position is illustrated at C-4 in FIG. 3. The containers then advance to an activating station indicated by reference numeral 58 in FIG. 3, the carton C-5 being illustrated in the activating station in FIG. 3. A clamping and sealing station is indicated by reference numeral 60 in FIG. 3. The position of the carton in the clamping and sealing station 60 is indicated at C-6. When the carton advances from position C-6 to position C-7, the carton top end closure is in the condition illustrated in FIG. 11. The top is closed as shown in FIG. 12 by apparatus forming no part of the present invention.

The apparatus shown in FIGS. 1 through 3 includes a pair of production lines spaced from each other on opposite sides of the longitudinal axis of the apparatus. Reference numerals 40' and 52' in FIG. 2 indicate the activating and sealing assembly and closing plates, respectively, of the second production line. The assembly 40' and closing plates 52' are identical to the assembly 40 and closing plates 52, and only the latter will be described in detail. The production line including assemblies 40' and closing plates 52' is visible only in FIG. 2 of the drawings.

Figure 4:
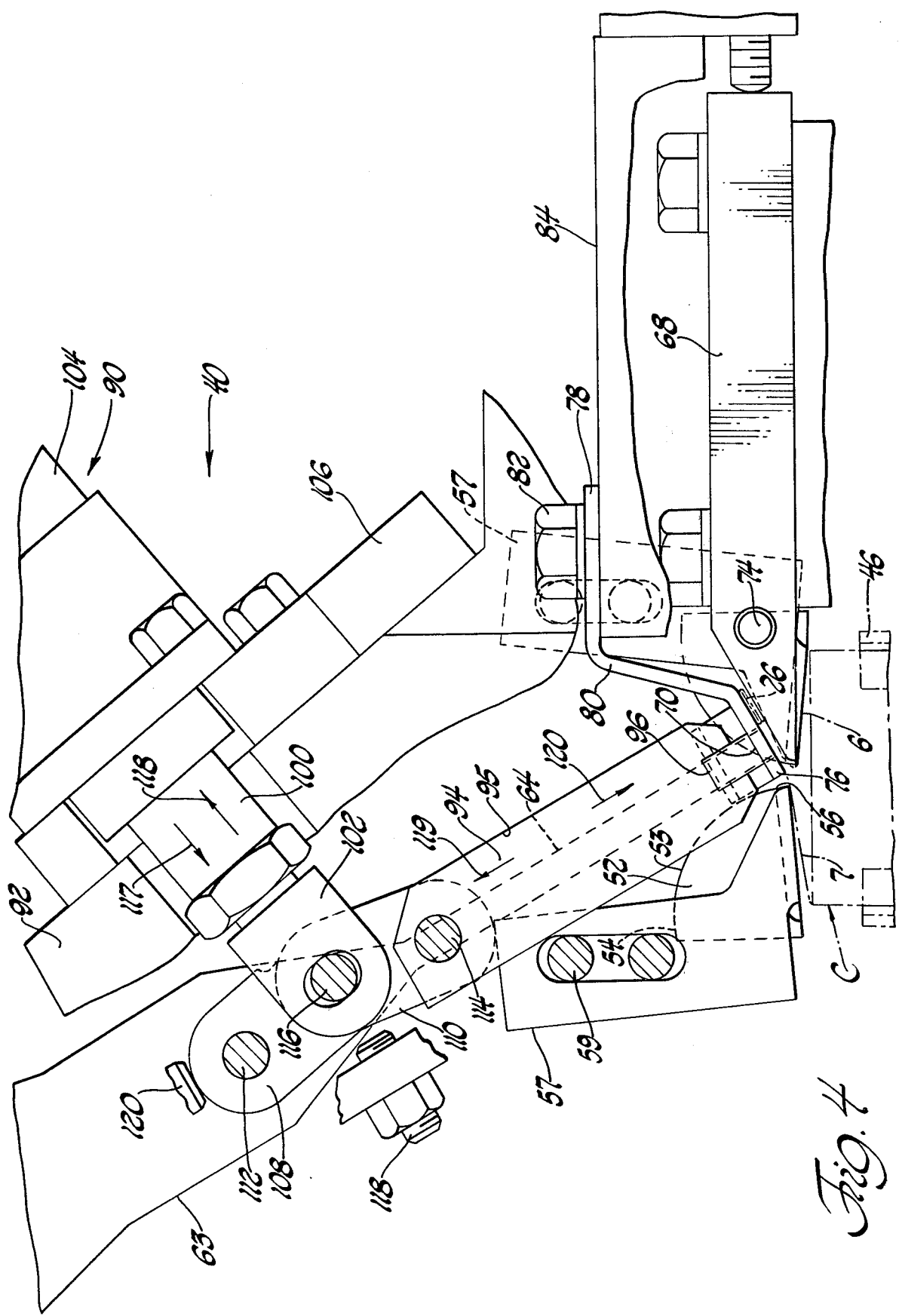
FIG. 4 is an enlarged view of a portion of the apparatus as seen in FIG. 1.

With reference primarily to FIGS. 1 and 4, the assembly 40 includes a vibration or sonic welding unit 62 mounted on a support bracket 65. The sonic welding unit 62 may be of the type disclosed in U.S. Pat. No. 3,910,014 and includes a concentrating horn 63 having a flat blade-like portion 64 with a working surface 66 (FIG. 5) defined at its lower end. The working surface 66 is the surface that engages the layers of the container end closure C. In the specific example of container C illustrated in FIGS. 8 through 12, the working surface 66 engages the top end closure rear panel 7 on the band 28 (FIG. 12).

The sonic welding device 62 includes a housing 67 for a converter for converting electrical energy into mechanical energy, which converter causes the horn 63, 64 to vibrate at a desired frequency.

The assembly 40 also includes a back-up member in the form of an anvil 68 having a working surface 70. The working surface 70 is the surface that is engaged by the layers of the end closure of the container. For the particular container C illustrated in FIGS. 8 through 12, the working surface 70 of the anvil 68 engages the outer surface of the sealing strip 22. Consequently, when the working surface 66 of the horn blade 64 engages the sealing strip 25 on its outer surface, the thermoplastic coating of the layers is activated along the bands 28 illustrated in FIGS. 11 and 12.

The anvil 68 is in the form of a plate-like member with the working surface 70 inclined downwardly and toward the left as viewed in FIG. 1. The anvil 68 (FIG. 6) is formed with a pair of spaced, transverse passages 72 which communicate with a longitudinal passage 74 so that water or other cooling fluid can be circulated through the anvil 68 during operation of the assembly 40.

The assembly 40 also includes a holding member 76 in the form of an elongated plate-like member which extends parallel to and overlies the working surface 70 of the anvil 68. The holding member 76 is formed with an arm 80 (FIG. 4) with a mounting flange 78 projecting therefrom. The mounting flange 78 is formed with openings for receiving fasteners 82 for securing the holding member 76 to a mounting plate 84 overlying the anvil 68. The holding member 76 is formed at one end with a tongue portion 86 that curves outwardly away from the working surface 70 of the anvil 68 as shown in FIG. 3. The tongue portion 86 projects beyond the support member 61 and overlies the narrow, outlet end of the closing slot 55 defined at the ends 56 of the edges 53 of the closing plates 52. An elongated slot 88 is formed in the holding member 76 as shown in FIG. 3. As a carton advances from position C-3 to position C-4 in FIG. 3, the closure flap 26 and sealing strip 25 is engaged by the tongue portion 86 to cause the sealing strips 22, 25 and closure flap 26 to close together and move into the space between the holding member 76 and the working surface 70 of the anvil 68 as illustrated in FIG. 4. When the sealing strips 22, 25 and closure flap 26 are received beneath the holding member 76, the carton is approximately in the configuration illustrated in FIG. 10 with the outer portion of the rear panel 7 (FIG. 12) along the band 28 exposed through the slot 88 to the working surface 66 of the horn blade 64.

Figure 5:
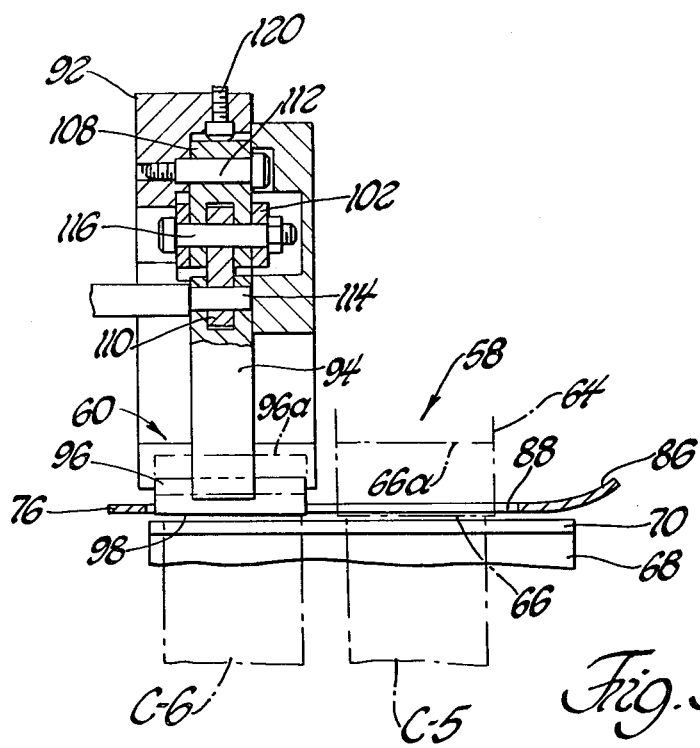
FIG. 5 is a sectional view taken on lines 5—5 of FIG. 1.

The assembly 40 also includes a clamping and sealing assembly indicated collectively by reference numeral 90 and including a mounting bracket 92 (See particularly FIGS. 1, 4 and 5). A pressure pad support member 94 in the form of a rectangular rod is received in a guide slot 95 formed in the mounting bracket 92 so that the support member 94 can reciprocate along its longitudinal axis within the guide slot 95. A pressure pade 96 in the form of a rectangular blade of stainless steel or the like is secured to the lower end of the support member 94 (See particularly FIG. 5). The pressure pad 96 has a working surface 98 defined on its lower edge for engaging the outer surface of the layers of the carton top to be sealed. In the illustrated embodiment of the carton, the working surface 98 engages the outer surface of the rear panels 7 along the band 28 illustrated in FIG. 12. The pressure pad 96 and support rod 94 are caused to reciprocate between an extended position illustrated in FIG. 4 to engage the outer surface of the carton top layers through the slot 88 as shown in FIG. 4, and a retracted position spaced from the carton layers received beneath the holding member 76. The rod 64 is caused to reciprocate in the guide groove 95 in response to movement of an operating member 100. Motion transmitting means is interconnected between the operating member 100 and support rod 94 for causing the pressure pad 96 to move between its extended and retracted position in response to movement of the operating member 100. The motion transmitting means is in the form of a pair of toggle links 108 and 110.

The operating member 100 is in the form of the rod of a piston received in a cylinder 104 secured to a cylinder support bracket 106 (FIGS. 1 and 4). The cylinder 104 is connected with its source (not shown) of air or other fluid under pressure which can be controlled in a conventional manner to cause the operating member 100 to reciprocate along its axis. The toggle link 108 is pivotally connected at its upper end to the mounting bracket 92 by a pin 112. The lower end of toggle link 108 is pivotally connected by a pin 116 with the upper end of toggle link 110, as well as with the clevis 102 formed on the end of the operating rod 100. The lower end of toggle link 110 is pivotally connected by a pin 114 with the upper end of the pressure pad support rod 94.

When the cylinder 104 is actuated to cause the operating rod 100 to retract in the direction of arrow 118 in FIG. 4, the toggle linkage 108, 110 causes the pressure blade support member 94 to move upwardly in the direction of arrow 119. Conversely, when the cylinder 104 is actuated to cause the operating member 100 to extend from the cylinder 104 in the direction of arrow 117 in FIG. 4, the toggle linkage 108, 110 causes the pressure blade support rod 94 to move downwardly in the direction of arrow 120 to cause the working surface 98 of the pressure blade 96 to project through slot 88 of the holding member 76 into engagement with the outer surface of the rear panel 7 of the carton C. An adjustable stop screw 118 is mounted in the mounting bracket 92 and projects into the path of the clevis 102 and is connected with the links 108 and 110 to prevent overtravel of the operating member 100 in the direction of arrow 117. A screw 120 (FIGS. 4 and 5) is threadedly mounted in the mounting bracket 92 with its head portion engaging the upper peripheral edge of the link 108.

Figure 6:
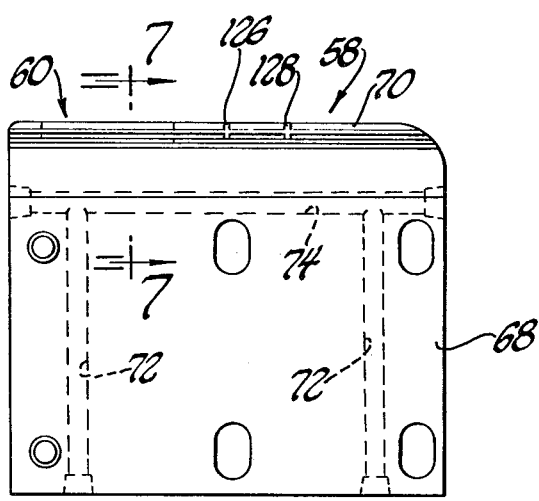
FIG. 6 is a top plan view of the anvil.
Figure 7:
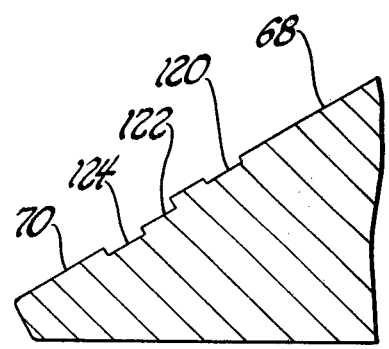
FIG. 7 is a sectional view taken on lines 7—7 of FIG. 6.

With reference to FIGS. 6 and 7, the working surface 70 of the anvil 68 is formed with longitudinal grooves 120, 122 and 124 as well as transverse recesses 126 and 128 to accommodate for the varying thicknesses along the band 28 of the carton C (FIGS. 11 and 12), and to assure that the activated thermoplastic material will flow into and fill all spaces between the layers sandwiched between the bands 28 when these layers are pressed against the working surface 70 of the anvil by the working surfaces 66 and 98 of the horn and pressure pad, respectively. The grooves 120, 122 and 124, as well as the recesses 126 and 128 function in a manner similar to the anvil disclosed in U.S. Pat. No. 3,910,014.

As discussed previously, the horn 63 is mounted in the housing 67 of the sonic welding unit 62 in such a manner that the horn 63 moves between an extended, active position in which the blade 64 projects through the slot 88 of the holding member 76 into engagement with the outer surface of the rear panel 7 of the carton C along the band 28, and a retracted position withdrawn from the slot 88 with the working surface 66 in the position illustrated approximately at 66a in FIG. 5 in phantom lines.

Similarly, the pressure pad 96 is movable by the operating member 100 and toggle linkage 108, 110 between an extended, active position in which the blade projects into the slot 88 so that the working surface 98 of the pressure pad 96 engages the outer surface of the rear panel 7 along the band 28 of the carton (FIGS. 11 and 12). When the operating member is retracted, the pressure pad 96 moves to a retracted, inactive position illustrated approximately at 96a in FIG. 5.

In operation, the cartons advance toward the left in FIG. 3 in the direction of arrow 50 sequentially through positions C-1 through C-7. As a carton advances from the wide end of the slot 55 defined by the edges 53 of the closing members 52 to the small end of the slot 55 adjacent support member 61, the panels of the top end closure of the carton C are folded from the position illustrated approximately in FIG. 9 to the position illustrated in FIG. 10. As the closure flap 26 and the sealing strips 22, 25 engage the tongue portion 86 of the holding member 76, the outwardly projecting portion of the end closure defined by the sealing strips 22, 25 and closure flap 26 in FIG. 10 is forced into the space between the holding member 76 and the working surface 70 of the anvil 68. When the carton reaches the activating station 58 (position C-5 in FIG. 3), the carton engages a microswitch or other control member interconnected with the controls of the sonic welding unit 40. The horn blade 64 sequentially begins to vibrate at a predetermined frequency (for example 20,000 cycles per second) and then moves from its retracted position to its extended position in which the working surface 66 projects through the slot 88 into engagement with the outer surface of the layers of the carton end closure in the area to be sealed, i.e., the area indicated by band 28 in FIGS. 11 and 12. The vibration of the horn generates frictional heat sufficiently to activate the thermoplastic coating of the paperboard layers of the carton along the band 29 to cause the thermoplastic material to flow. After the horn has been energized to vibrate in engagement with the outer surface of the carton layers for a predetermined period of time (for example 0.15 seconds), the horn is deenergized to stop the vibrating, but remains in clamping engagement with the layers for a second predetermined period of time (e.g. 0.25 seconds) to permit the thermoplastic material to partially set to begin formation of a seal. The partial setting is enhanced by the flow of cooling fluid through the passages 72 and 74 of the anvil 68. The horn is then retracted out of engagement with the carton layers, and the holding member 76 prevents the layers from separating, even though the thermoplastic material has only partially set. The carton is then advanced by the conveyor to the clamping and sealing station 60 (position C-6 in FIG. 3). The engagement of the holding member 76 with the outer surface of the carton layers prevents the layers from separating as the carton moves from the activating station 58 (position C-5) to the clamping and sealing station 60 (position C-6).

When the carton reaches the clamping and sealing station 60 at position C-6, the cylinder 104 is actuated to cause the operating member 100 to extend from the cylinder 104 to cause the pressure pad 96 to move in the direction of arrow 120 in FIG. 4 from its retracted position to its extended position as illustrated in FIG. 5. The working surface 98 of the pressure pad 96 engages the outer surface of the layers along the band 28 to clamp the layers between the working surfaces 98 and 70 at a predetermined pressure for a predetermined period of time to permit the thermoplastic material to completely set and form a seal. The clamping and sealing cycle should be approximately the same amount of time as the activating cycle. In the example given in the preceding paragraph, the horn is in clamping engagement with the carton layers for a period of 0.40 seconds with the horn vibrating for a period of 0.15 seconds and simply clamping and holding the layers for the remaining period of 0.25 seconds. Consequently, the clamping and sealing cycle in which the carton is subsequently clamped between the working surfaces 98 and 70 of the pressure pad 96 and anvil, respectively, will be 0.40 seconds.

When a carton reaches position C-5 at the activating station 58, the carton engages a microswitch or other control element to start the activating cycle of sequentially (1) pretriggering the retracted horn to vibrate its predetermined frequency of, for example, 20,000 cycles per second, (2) cause the energized, vibrating horn to move to its extended position in which the working surface 66 thereof projects through the slot 88 into clamping engagement with the outer surface of the layers to be sealed along the band 28, (3) deenergize the horn in its extended position after a predetermined period of time sufficient to activate the thermoplastic material along the band 28, (4) cause the deenergized horn to remain in clamping engagement with the layers to be sealed for a second predetermined period of time to permit partial setting of the thermoplastic material along the sealing band 28, and (5) cause the horn to return to its retracted, inactive position at the end of the second predetermined period of time. In the example discussed above, the first predetermined time period in which the horn is energized may be 0.15 seconds, and the second predetermined period of time in which the horn is deenergized while still in clamping engagement with the layers is 0.25 seconds for a total activating cycle of 0.40 seconds.

When the horn retracts, the conveyer indexes to move the carton from the activating station 58 to the clamping and sealing stations 60 with the carton in position C-6 as illustrated in FIG. 3. Again, the carton engages a microswitch or other control when it reaches position C-6 to cause the air cylinder 104 to extend the operating member 100 and move the pressure pad 96 from its retracted position to its extended, active position in clamping engagement with the carton along the band 28. The carton layers along the band 28 are clamped between the working surfaces 98 and 70 for the same period of time as the activating cycle, i.e., 0.40 seconds in the example discussed above. Microswitches or other control devices are provided at each of the positions so that if a carton does not reach either position C-5 or C-6, the horn or pressure pad will not extend into engagement with the working surface 70 of the anvil.

The specific times of 0.15 seconds, 0.25 seconds and 0.40 seconds given above are by way of example only and are not to be considered as limitations in the invention. These times will vary under different conditions, with different materials, different thicknesses and sizes of the containers, etc. Other operating cycles are possible at each of stations 58 and 60 with the apparatus disclosed.

To further increase the rate of cooling and setting of the previously activated thermoplastic material, passages may be provided in the pressure pad 96 for water or other cooling liquid to be circulated through the pressure pad during its operation to increase the rate at which heat is removed from the layers clamped between the working surfaces 98 and 70.

In the illustrated embodiment, the working surfaces 66 and 98 of the horn and pressure pad are planar and parallel to the plane of the work surface 70 of the anvil 68. Further, both the horn and pressure pad move between their extended and retracted positions in a path transverse to the planes of their respective work surfaces 66 and 98. The longitudinal axis of the cylinder 104 and piston rod or operating member 100 is normal or transverse to the path of movement of the pressure pad, and hence is parallel to the plane of the work surfaces 98 and 70.

While a specific form of the invention is described in the foregoing specification and illustrated in the accompanying drawings, it should be understood that the invention is not limited to the exact construction shown. To the contrary, various alterations in the construction and arrangement of parts, as well as the sequence of steps, all falling within the scope and spirit of the invention will be apparent to those skilled in the art.

What is claimed is:

1. Apparatus for forming a seal between layers of a carton of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said apparatus comprising: means defining a sealant activating station at one location; means defining a clamping and sealing station at another location; back-up means extending between said stations, said back-up means having a work surface for engaging one outer surface of the layers in the area to be sealed; a holding member extending between said stations, said holding member overlying said back-up means for engaging said opposite outer surface of the layers to hold the layers together in cooperation with the back-up means when a carton is located at either of said stations or between said stations; a horn located at said acitvating station that vibrates at a predetermined frequency when energized; said horn having a work surface for engaging the opposite outer surface of the layers in the area to be sealed and that opposes the work surface on the back-up means at the activating station; said horn being movable with respect to said back-up means between a retracted inactive position and an extended active position in which the opposed work surfaces of the horn and back-up means engage the layers to be sealed in a clamping relationship such that vibration of said horn generates frictional heat to activate the thermoplastic material of said layers; a pressure pad located at said clamping and sealing station; said pressure pad having a work surface for engaging said opposite outer surface of the layers and that opposes the work surface of the backup means at the clamping and sealing station; said pressure pad being movable with respect to said back-up means between a retracted inactive position and an extended active position in which the opposed work surfaces of the pressure pad and back-up means engage the layers to be sealed in a clamping relationship; said horn being operable to move from the retracted inactive position when a carton is placed into the activating station and return to the retracted inactive position after remaining in the active position with the horn energized a predetermined period of time sufficient to activate the thermoplastic material; carton carrying means operable to carry a carton with activated thermoplastic from the activating station upon retraction of the horn to the clamping and sealing station prior to cooling and setting of the activated thermoplastic; said pressure pad being operable to move from the retracted inactive position to the extended active position when a carton with activated thermoplastic moves into the clamping and sealing station to clamp the layers with activated thermoplastic together and return to the retracted inactive position after remaining in the active position a predetermined period of time sufficient to permit the activated thermoplastic to cool and set.

2. Apparatus as claimed in claim 1 wherein said holding member comprises an elongated plate member having a slot therein for exposing the outer surface of the area of the layer to be sealed and permitting engagement of such outer surface by the work surfaces of said horn and pressure pad.

3. Apparatus as claimed in claim 2 wherein said holding member is formed with a curved guide tongue at one end thereof for guiding layers to be sealed into the space between the holding member and back-up member to close the layers together.

4. Apparatus as claimed in claim 1 further including a pressure pad mounting bracket and motion transmitting means connected between said pressure pad mounting bracket and said pressure pad for actuating said pressure pad between its retracted and extended positions.

5. Apparatus as claimed in claim 4 further including a movable operating member connected with said motion transmitting means to cause said motion transmitting means to actuate said pressure pad between its retracted and extended positions in response to movement of said operating member.

6. Apparatus as claimed in claim 5 further including a pressure pad support rod, said pressure pad being mounted on one end of said pressure pad support rod, and said motion transmitting means being connected with the other end of said pressure pad support rod, and a guide slot in said pressure pad mounting bracket to guide said pressure pad support rod in a path perpendicular to the work surface of said back-up member as said pressure pad moves between said extended and retracted positions.

7. Apparatus as claimed in claim 6 wherein said motion transmitting means comprises a toggle linkage connected between said mounting bracket and pressure pad support rod.

8. Apparatus as claimed in claim 7 wherein said toggle linkage includes a pair of toggle links pivotally connected in an end to end relationship between said mounting bracket and said other end of said pressure pad support rod, said operating member having one end pivotally connected to said links at the pivotal connection of said links with each other.

9. Apparatus as claimed in claim 8 further including power means for causing movement of said operating member in a path substantially parallel to the plane of the work surface of said back-up member and transverse to the path of movement of said pressure pad.

10. Apparatus as claimed in claim 9 wherein said power means comprises a piston and cylinder assembly, and said operating member comprises the piston rod of said piston cylinder assembly.

11. Apparatus as claimed in claim 10 wherein said holding member comprises a plate having a slot formed therein for exposing the outer surface of the area to be sealed and permitting engagement thereof by the work surface of said horn and pressure pad.

12. Apparatus as claimed in claim 11 wherein said holding member is formed with a curved guide tongue at one end thereof for guiding the layers to be sealed into the space between said holding member and back-up member to hold the layers together in a closed condition.

13. Apparatus as claimed in claim 12 wherein the working surface of said back-up member is formed with longitudinal grooves and transverse recesses for accommodating variations in the thickness of the layers in the area to be sealed.

14. Apparatus as claimed in claim 13 further including passages formed in said back-up member for conducting cooling fluid through said back-up member to remove heat from the working surface thereof.

15. Apparatus as claimed in claim 14 further including a pair of closing members on the side of said activating station opposite said clamping and sealing station, said closing members having a pair of opposed edges defining a closing slot with the end of said slot opposite said activating station being wide and the end of said slot adjacent said activating station being narrow, said opposed edges curving downwardly from said wide end to said narrow end.

16. Apparatus as claimed in claim 15 wherein said tongue portion of said holding member projects over the narrow end of said closing slot.

17. Apparatus as claimed in claim 1 further including passages formed in said back-up member for conducting cooling fluid through said back-up member to remove heat from the working surface thereof.

18. Apparatus as claimed in claim 17 wherein said tongue portion of said holding member projects over the narrow end of said closing slot.

19. Apparatus as claimed in claim 1 further including passages formed in said back-up member for conducting cooling fluid through said back-up member to remove heat from the working surface thereof.

20. Apparatus for forming a seal between layers of a carton end closure of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said apparatus comprising: a back-up member having a work surface for engaging one outer surface of the layers in the area to be sealed; a holding member overlying said back-up member for engaging said opposite outer surface of the layers to hold the layers together in cooperation with the back-up member; a pressure pad; said pressure pad having a work surface for engaging said opposite outer surface of the layers and that opposes the work surface of the back-up member; said pressure pad being movable with respect to said back-up member between a retracted inactive position and an extended active position in which the opposed work surfaces of the pressure pad and back-up member engage the layers to be sealed in a clamping relationship; said pressure pad being operable to move from the retracted inactive position to the extended active position when the layers of a carton end closure with activated thermoplastic is disposed between the work surfaces of the pressure pad and back-up member to clamp the layers with activated thermoplastic together and return to the retracted inactive position after remaining in the active position a predetermined period of time sufficient to permit the activated thermoplastic to cool and set.

21. Apparatus as claimed in claim 20 wherein said holding member comprises an elongated plate member having a slot therein for exposing the outer surface of the area of the layers to be sealed and permitting engagement of such outer surface by the work surface of said pressure pad.

22. Apparatus as claimed in claim 21 wherein said holding member is formed with a curved guide tongue at one end thereof for guiding layers to be sealed into the space between the holding member and back-up member to close the layers together.

23. Apparatus as claimed in claim 20 further including a pressure pad mounting bracket and motion transmitting means connected between said pressure pad mounting bracket and said pressure pad for actuating said pressure pad between its retracted and extended positions.

24. Apparatus as claimed in claim 23 further including a movable operating member connected with said motion transmitting means to cause said motion transmitting means to actuate said pressure pad between its retracted and extended positions in response to movement of said operating member.

25. Apparatus as claimed in claim 24 further including a pressure pad support rod, said pressure pad being mounted on one end of said pressure pad support rod, and said motion transmitting means being connected with the other end of said pressure pad support rod, and a guide slot in said pressure pad mounting bracket to guide said pressure pad support rod in a path perpendicular to the work surface of said back-up member as said pressure pad moves between said extended and retracted positions.

26. Apparatus as claimed in claim 25 wherein said motion transmitting means comprises a toggle linkage connected between said mounting bracket and pressure pad support rod.

27. Apparatus as claimed in claim 26 wherein said toggle linkage includes a pair of toggle links pivotally connected in an end to end relationship between said mounting bracket and said other end of said pressure pad support rod, said operating member having one end pivotally connected to said links at the pivotal connection of said links with each other.

28. Apparatus as claimed in claim 27 further including power means for causing movement of said operating member in a path substantially parallel to the plane of the work surface of said back-up member and transverse to the path of movement of said pressure pad.

29. Apparatus as claimed in claim 28 wherein said power means comprises a piston and cylinder assembly, and said operating member comprises the piston rod of said piston cylinder assembly.

30. Apparatus as claimed in claim 29 wherein said holding member comprises a plate having a slot formed therein for exposing the outer surface of the area to be sealed and permitting engagement thereof by the work surface of said pressure pad.

31. Apparatus as claimed in claim 30 wherein said holding member is formed with a curved guide tongue at one end thereof for guiding the layers to be sealed into the space between said holding member and back-up member to hold the layers together in a closed condition.

32. Apparatus as claimed in claim 31 wherein the working surface of said back-up member is formed with longitudinal grooves and transverse recesses for accommodating variations in the thickness of the layers in the area to be sealed.

33. Apparatus as claimed in claim 32 further including passages formed in said back-up member for conducting cooling fluid through said back-up member to remove heat from the working surface thereof.

34. Apparatus as claimed in claim 20 further including passages formed in said back-up member for conducting cooling fluid through said back-up member to remove heat from the working surface thereof.

35. A method of forming seals between the layers of the end closures of thermoplastic coated paperboard cartons by vibration welding comprising the steps of: moving each carton into a position in which its end closure is disposed between the spaced apart work surfaces of a vibrating horn and back-up member; pretriggering the horn to energize it and cause it to vibrate at a predetermined frequency; moving the work surfaces of the back-up member and energized horn into opposed, clamping relationship with the layers of the end closure at a clamping pressure within predetermined limits over the entire area of the layers between the work surfaces; holding the energized horn in said clamping relationship for a predetermined period of time to activate the thermoplastic coating to flow; de-energizing the horn while still in the clamping position and holding the de-energized horn in said clamping position for a predetermined period of time to permit the activated thermoplastic to partially set; separating the work surfaces of the de-energized horn and back-up member; moving the carton with the partially activated thermoplastic to a cooling and clamping station with the end closure disposed between the spaced apart work surfaces of a pressure pad and back-up member; moving the work surfaces of the pressure pad and back-up member into opposed, clamping relationship with the layers of the end closure at a predetermined clamping pressure; holding the pressure pad in said clamping relationship for a predetermined period of time to permit the thermoplastic to complete this set; and then separating the work surfaces of the pressure pad and back-up member to permit the carton end closure to be moved from the clamping and sealing station.

36. A method of closing the end closure of a thermoplastic coated paperboard carton and sealing the layers of the end closure by vibration welding comprising the steps of: moving the carton with the open end closure between a pair of closing members having spaced apart edges to define a closing slot with the edges of the closing members converging from a wide end to a narrow end to close the layers of the end closure together; moving the closed end closure between a holding member and a working surface of a back-up member with an activating station and clamping and sealing station defined at spaced locations along the holding member and back-up member; pretriggering a vibrating welding horn at the activating station to cause it to vibrate at a predetermined frequency; moving the work surface of the vibrating horn into clamping relationship with the layers of the end closure and holding the vibrating horn in said clamping relationship for a predetermined period of time to activate the thermoplastic coating of the paperboard layers to flow; de-energizing the horn while still in the clamping position and holding the de-energized horn in said clamping position for a predetermined period of time to permit the activated thermoplastic to partially set; separating the work surface of the horn to permit the carton end closure to be advanced from the activating station to the clamping and sealing station while the layers are still held closed together between the holding member and work surface of the back-up member; moving the work surface of a pressure pad into clamping relationship with the end closure for a predetermined period of time to permit the thermoplastic material to completely set, and then separating the pressure pad work surface from the end closure to permit the carton end closure to be moved from the clamping and sealing station.

37. Apparatus for forming a seal between layers of a carton end closure of thermoplastic coated paperboard material and the like wherein the thermoplastic material of the layers in the area to be sealed serves as the sealant and is activated by frictional heat from a vibration welding horn and then allowed to cool and set under pressure to form a seal between the layers, said apparatus comprising: a back-up member having a work surface for engaging one outer surface of the layers in the area to be sealed; a pressure pad; said pressure pad having a work surface for engaging said opposite outer surface of the layers and that opposes the work surface of the back-up member; said pressure pad being movable with respect to said back-up member between a retracted inactive position and an extended active position in which the opposed work surfaces of the pressure pad and back-up member engage the layers to be sealed in a clamping relationship; said pressure pad being operable to move from the retracted inactive position to the extended active position when the layers of a carton end closure with activated thermoplastic is disposed between the work surfaces of the pressure pad and back-up member to clamp the layers with activated thermoplastic together and return to the retracted inactive position after remaining in the active position a predetermined period of time sufficient to permit the activated thermoplastic to cool and set.

38. Apparatus for forming a seal between layers of a carton end closure of thermoplastic coated paperboard material and the like wherein the thermoplastic material of the layers in the area to be sealed serves as the sealant and is activated by frictional heat and then allowed to cool and set under pressure to form a seal between the layers, said apparatus comprising: means defining a sealant activating station at one location wherein the thermoplastic material of the layers in the area to be sealed is activated and a clamping and sealing station at another location; a back-up member extending between said stations and having a work surface for engaging one outer surface of the layers in the area to be sealed; a pressure pad; said pressure pad having a work surface for engaging said opposite outer surface of the layers and that opposes the work surface of the back-up member; said pressure pad being movable with respect to said back-up member between a retracted inactive position and an extended active position in which the opposed work surfaces of the pressure pad and back-up member engage the layers to be sealed in a clamping relationship; said pressure pad being operable to move from the retracted inactive position to the extended active position when the layers of a carbon end closure with activated thermoplastic is disposed between the work surfaces of the pressure pad and back-up member to clamp the layers with activated thermoplastic together and return to the retracted inactive position after remaining in the active position a predetermined period of time sufficient to permit the activated thermoplastic to cool and set.

39. Apparatus as claimed in claim 38 further including a horn located at said activating station that vibrates at a predetermined frequency when energized; said horn having a work surface for engaging the opposite outer surface of the layers in the area to be sealed and that opposes the work surface on the back-up means at the activating station; said horn being movable with respect to said back-up means between a retracted inactive position and an extended active position in which the opposed work surfaces of the horn and back-up means engage the layers to be sealed in a clamping relationship such that vibration of said horn generates frictional heat to activate the thermoplastic material of said layers.

40. Apparatus as claimed in claim 39 wherein said horn is operable to move from the retracted inactive position when a carton is placed into the activating station and return to the retracted inactive position after remaining in the active position with the horn energized a predetermined period of time sufficient to activate the thermoplastic material.

* * * * *

UNITED STATES PATENT AND TRADEMARK OFFICE
CERTIFICATE OF CORRECTION

PATENT NO. : 4,145,236                    Page 1 of 4

DATED : March 20, 1979

INVENTOR(S) : Jack M. Neumayer and Ivan L. Kauffman

It is certified that error appears in the above-identified patent and that said Letters Patent are hereby corrected as shown below:

Column 1, line 12, delete the word "paperbo" and insert the following:

--paperboard material and the like wherein the thermoplastic material of the layers is activated by frictional heat from a vibration welding horn and then allowed to cool and set under pressure to form a seal between the layers.

Description of the Prior Art

The type of container with which the present invention is particularly concerned is the type made of paperboard stock coated on both sides with a thermoplastic material such as polyethylene. The thermoplastic coating is utilized not only as moisture proofing material, but also serves as an adhesive which cooperates in sealing the seams, joints and closure elements of the container so as to make the container fluid tight when it is filled with milk or other contents, and sealed and closed. An example of this general type of container is disclosed in U.S. Patent Nos. 3,120,089, 3,309,841 and 3,910,014.

Until recently, the conventional manner of sealing thermoplastic coated paperboard cartons was to activate the thermoplastic coating, by the application of heat, to cause it to flow at the portions to be joined and sealed, and then bring the layers of the end closures into contact with each other. When the thermoplastic material between the layers cools and sets, the layers are sealed and fused together. In addition to requiring the use of elaborate and expensive apparatus for generating the considerable amount of energy required, elaborate apparatus, methods and systems are also required to dissipate the heat from the plant in which the packaging operation is being carried out. Examples of this general type of packaging

UNITED STATES PATENT AND TRADEMARK OFFICE
CERTIFICATE OF CORRECTION

PATENT NO. : 4,145,236

DATED : March 20, 1979

INVENTOR(S) : Jack M. Neumayer and Ivan L. Kauffman

It is certified that error appears in the above-identified patent and that said Letters Patent are hereby corrected as shown below:

apparatus are shown in U.S. Patent Nos. 3,002,328; 3,120,089; 3,166,994; 3,187,647; 3,239,995 and 3,309,841.

U.S. Patent Nos. 3,905,280 of September 16, 1975 and 3,910,014 of October 7, 1975 disclose apparatus for sealing the end closures and side seams of thermoplastic coated paperboard containers by vibration welding wherein mechanical energy is converted into localized heat energy to minimize the amount of heat and energy required, and to eliminate the necessity for expensive systems and methods for dissipating the excess heat. U.S. Patent No. 3,526,792 discloses an ultrasonic transducer having a converter for converting electrical energy into mechanical energy, and a concentrating horn for concentrating the mechanical energy into vibrations at a desired frequency. In the above mentioned U.S. Patent Nos. 3,905,280 and 3,910,014, the horn vibrates a predetermined frequency when energized, and cooperates with an anvil or other back-up means to clamp the layers of the thermoplastic coated paperboard between the working surface of the horn and back-up or work surface of the anvil. When the thermoplastic coated paperboard layers are clamped between the work surfaces of the horn and anvil, vibration of the horn creates frictional heat sufficient to activate the thermoplastic coating of the layers to cause the thermoplastic material of the layers to flow together. When the vibration is terminated, the thermoplastic will cool and set to form a seal between the layers and to adhesively secure the layers together throughout the area of the seal.

An additional advantage to sealing by sonic, or vibration welding, is that it is not necessary to allow for any surface contamination or moisture because of the concentrated application of energy. When heat is applied directly rather than by vibration welding, energy must be expended to evaporate any mois-

UNITED STATES PATENT AND TRADEMARK OFFICE
CERTIFICATE OF CORRECTION

PATENT NO. : 4,145,236

DATED : March 20, 1979

INVENTOR(S) : Jack M. Neumayer and Ivan L. Kauffman

It is certified that error appears in the above-identified patent and that said Letters Patent are hereby corrected as shown below:

ture on the sealing surfaces before the thermoplastic material can be heated sufficiently to activate it. Variations in the amount of moisture on the sealing surface causes a wide variation in the thermal energy required. Moreover the presence of moisture causes the thermal energy input demand to be far in excess of that which is required to activate the thermoplastic when the surfaces are dry. This problem is obviated by vibration welding because of the concentrated application of energy making the amount of energy required to evaporate any moisture inconsequential.

There are two stages in the sealing operation of thermoplastic coated paperboard containers by vibration welding. These stages are: (1) the activation stage in which the friction of the vibrating horn generates heat sufficient to activate the thermoplastic coating, and (2) the cooling stage wherein the layers are clamped together to permit the previously activated thermoplastic coating to cool and set to form the seal.

A significant factor in determining the production rate is the amount of time required in the sealing operation. It has been a general practice to utilize the horn exclusively for both the activation stage and as a clamping member for the cooling stage.

Column 2, line 30
"paperborad" should be --paperboard--.

Column 3, line 65
"portion" should be --position--.

Column 4, lines 39 and 40
"and enc" should be --the end--.

UNITED STATES PATENT AND TRADEMARK OFFICE
CERTIFICATE OF CORRECTION

PATENT NO. : 4,145,236
DATED : March 20, 1979
INVENTOR(S) : Jack M. Neumayer and Ivan L. Kauffman It is certified that error appears in the above-identified patent and that said Letters Patent are hereby corrected as shown below:

Column 13, line 1 (Claim 13, line 4), "thickness" should be --thicknesses--.

Column 16, line 51 (Claim 38, line 22), "carbon" should be --carton--.

Signed and Sealed this

Fifteenth Day of July 1980

[SEAL]

Attest:

SIDNEY A. DIAMOND

Attesting Officer     Commissioner of Patents and Trademarks